(12) United States Patent
Takahashi et al.

(10) Patent No.: US 11,897,053 B2
(45) Date of Patent: Feb. 13, 2024

(54) JOINING STRUCTURE

(71) Applicant: DENSO CORPORATION, Kariya (JP)

(72) Inventors: Yuuya Takahashi, Kariya (JP); Syusuke Ootsuki, Kariya (JP); Tomohiro Shimizu, Kariya (JP); Sumera Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 42 days.

(21) Appl. No.: 17/076,839

(22) Filed: Oct. 22, 2020

(65) Prior Publication Data
US 2021/0121982 A1    Apr. 29, 2021

(30) Foreign Application Priority Data

Oct. 23, 2019 (JP) ................................ 2019-192559

(51) Int. Cl.
*B23K 26/244* (2014.01)
*B23K 26/26* (2014.01)
(Continued)

(52) U.S. Cl.
CPC ............ *B23K 26/244* (2015.10); *B23K 26/21* (2015.10); *B23K 26/26* (2013.01); *B23K 26/32* (2013.01);
(Continued)

(58) Field of Classification Search
CPC .. B23K 26/244; B23K 26/26; B23K 2103/10; B23K 2103/14; B23K 26/21; B23K 26/32; F28F 21/08
(Continued)

(56) References Cited

U.S. PATENT DOCUMENTS 4,049,186 A * 9/1977 Hanneman ............. B23K 9/048
219/76.12
5,321,224 A * 6/1994 Kamimura ......... B23K 26/0006
219/137 R
(Continued)

FOREIGN PATENT DOCUMENTS

EP          0276078 A1 *  7/1988
JP       H04-210883 A      7/1992
(Continued)

OTHER PUBLICATIONS

Pariona, Moises, B. Teleginski, K. Santos, S. Machado, A. Zara, N. Zurba, and R. Riva; "Yb-fiber laser beam effects on the surface modification of Al—Fe aerospace alloy obtaining weld filet structures, low fine porosity and corrosion resistance," Oct. 2011, Surface and Coatings Technology, 2293-2301 (Year: 2011).*
(Continued)

*Primary Examiner* — Tu B Hoang
*Assistant Examiner* — Erwin J Wunderlich
(74) *Attorney, Agent, or Firm* — Harness, Dickey & Pierce, P.L.C.

(57) ABSTRACT

Provided is a joining structure capable of simplifying the manufacturing process and having high corrosion resistance. A joining structure has a welded part for connecting joined members made of a metal that forms a passive film. An outermost surface portion of the welded part has a pitting potential. The welded part may include a welded part main body formed inside and a surface-modified layer formed in contact with the welded part main body, and the surface-modified layer may include the outermost surface portion having a pitting potential.

5 Claims, 12 Drawing Sheets

(51) Int. Cl.
    *B23K 26/21*     (2014.01)
    *B23K 103/14*     (2006.01)
    *B23K 103/10*     (2006.01)
    *B23K 26/32*     (2014.01)

(52) U.S. Cl.
    CPC ...... *B23K 2103/10* (2018.08); *B23K 2103/14* (2018.08)

(58) Field of Classification Search
    USPC .......................................................... 420/8
    See application file for complete search history.

(56) References Cited

U.S. PATENT DOCUMENTS

| | | | | |
|---|---|---|---|---|
| 6,336,583 | B1* | 1/2002 | Wang | B23K 31/02 |
| | | | | 228/175 |
| 7,586,061 | B2* | 9/2009 | Hoebel | C23C 26/02 |
| | | | | 219/121.64 |
| 8,653,403 | B2* | 2/2014 | Honma | B23K 15/06 |
| | | | | 219/121.14 |
| 8,890,022 | B2* | 11/2014 | Beck | B23K 26/244 |
| | | | | 219/121.64 |
| 2012/0298638 | A1* | 11/2012 | Beck | B23K 26/26 |
| | | | | 219/121.64 |
| 2013/0140279 | A1* | 6/2013 | Bruck | B23K 35/0266 |
| | | | | 219/73.11 |
| 2014/0308154 | A1 | 10/2014 | Ishii et al. | |
| 2014/0339206 | A1* | 11/2014 | Ott | B23P 6/007 |
| | | | | 219/76.1 |
| 2015/0360256 | A1* | 12/2015 | Burbaum | B23K 26/354 |
| | | | | 427/383.1 |
| 2016/0167172 | A1* | 6/2016 | Goncharov | B23K 35/304 |
| | | | | 219/76.1 |
| 2018/0043472 | A1* | 2/2018 | Yang | B23K 26/322 |
| 2018/0214983 | A1* | 8/2018 | Yang | B23K 26/322 |
| 2020/0130104 | A1* | 4/2020 | E | C22F 1/02 |
| 2020/0171603 | A1* | 6/2020 | Yang | B23K 26/354 |
| 2021/0260699 | A1* | 8/2021 | Okuhira | B23K 26/14 |

FOREIGN PATENT DOCUMENTS

| | | |
|---|---|---|
| JP | H05-065530 A | 3/1993 |
| JP | H07-075893 A | 3/1995 |
| JP | H07-116886 A | 5/1995 |
| JP | 2017052004 A * | 3/2017 |
| WO | WO-2013/080526 A1 | 6/2013 |

OTHER PUBLICATIONS

Machine English Translation of JP-2017052004-A (Year: 2017).*
Wang, Wei et al.; "TEM study on oxide mechanism of the dissimilar welds between 316 stainless steels/Inconel 182 in high temperature and high pressure water;" Jul. 2017; Material Characterization 131 (2017); 339-347 (Year: 2017).*
Masahiro Seo, "Surface Oxidation of Allows—Behaviors in the Relatively Low Temperature Region", Faculty of Engineering, Hokkaido University, pp. 558-564, Jun. 17, 1989.
Motoaki Osawa et al., "Improvement of Corrosion Property by Laser Surface Modification", Faculty of Engineering, Tokyo Denki University, vol. 43, No. 4, pp. 216-225, 1994.

* cited by examiner

RADIUS r OF CONTOURS OF ENERGY BEAM

JOINING STRUCTURE

CROSS-REFERENCE TO RELATED APPLICATION

This application claims priority based on Japanese Patent Application No. 2019-192559 filed on Oct. 23, 2019, the entire contents of which are incorporated herein by reference.

BACKGROUND

The present disclosure relates to a joining structure.

Conventionally, when corrosion resistance is required for a welded part of a joining structure, measures are taken such as protecting the welded part by surface coating, or forming the welded part in an oxygen-free atmosphere.

SUMMARY

One aspect of the present disclosure resides in a joining structure (1) having a welded part (12) for connecting members to be joined (11) made of a metal that forms a passive film, wherein an outermost surface portion (120) of the welded part has a pitting potential.

In the means for solving the problems, the reference signs in parentheses are intended to indicate the correspondence with the specific means described in connection with the embodiments described later, and they do limit the technical scope of the present disclosure.

DETAILED DESCRIPTION OF THE PREFERRED EMBODIMENTS

The present disclosers performed a study on a joining structure having high corrosion resistance.

Japanese Patent Laid-Open No. 7-75893 discloses a technique that, in order to prevent stress corrosion cracking of a structure in a nuclear reactor, eliminates crack-like defects existing in the weld heat affected zone of the structure by making them melt with laser light, and irradiates again with laser light the surface of an area including the weld beads and their heat affected zone, or an area including the entire weld heat affected zone to heat it and then cool it rapidly, thereby forming rapidly solidified spots partially overlapping with each other which serve as a surface-modified layer.

However, the above-described joining structure formed by coating the surface of the welded part complicates the manufacturing process since the coating step is added. In addition, a joining structure that is welded in an oxygen-free atmosphere requires special equipment, which also complicates the manufacturing process.

The present disclosure has been devised in view of the above problems, and an object of the present disclosure is to provide a joining structure that can simplify the manufacturing process and has high corrosion resistance.

One aspect of the present disclosure resides in a joining structure (1) having a welded part (12) for connecting members to be joined (11) made of a metal that forms a passive film, wherein that an outermost surface portion (120) of the welded part has a pitting potential.

Since the outermost surface portion of the welded part of the above-described joining structure has a pitting potential, it has a high corrosion resistance even if the surface of the welded part is not coated. Therefore, according to the above-described joining structure, the step of coating the welded part becomes unnecessary, and the manufacturing process can be simplified accordingly. In addition, since the outermost surface portion of the welded part has a pitting potential, the welded part of the joining structure has a high corrosion resistance even if it is not manufactured in an oxygen-free atmosphere. Therefore, according to the joining structure, no special equipment is required to create an oxygen-free atmosphere and the manufacturing can be performed in the atmospheric air and thus the manufacturing process can be simplified accordingly. Further, since the joining structure can exhibit high corrosion resistance without using a special material having high corrosion resistance, it is possible to increase the degree of freedom in selecting the material of the members to be joined.

Therefore, according to the above-described joining structure, the manufacturing process can be simplified and a joining structure having high corrosion resistance can be provided.

In the following, examples of joining structures according to specific embodiments of the present disclosure will be described in detail with reference to the drawings. It should be noted that the dimensions of the members shown in the drawings are increased or reduced in size as appropriate for ease of explanation, and do not represent the actual sizes of the members. Further, when it is not necessary to specifically distinguish constituent elements, such as those having substantially the same functional configuration, the same reference sign is given. Furthermore, in the drawings, members that do not need to be described are omitted as appropriate for ease of explanation.

First Embodiment

Figure 1:
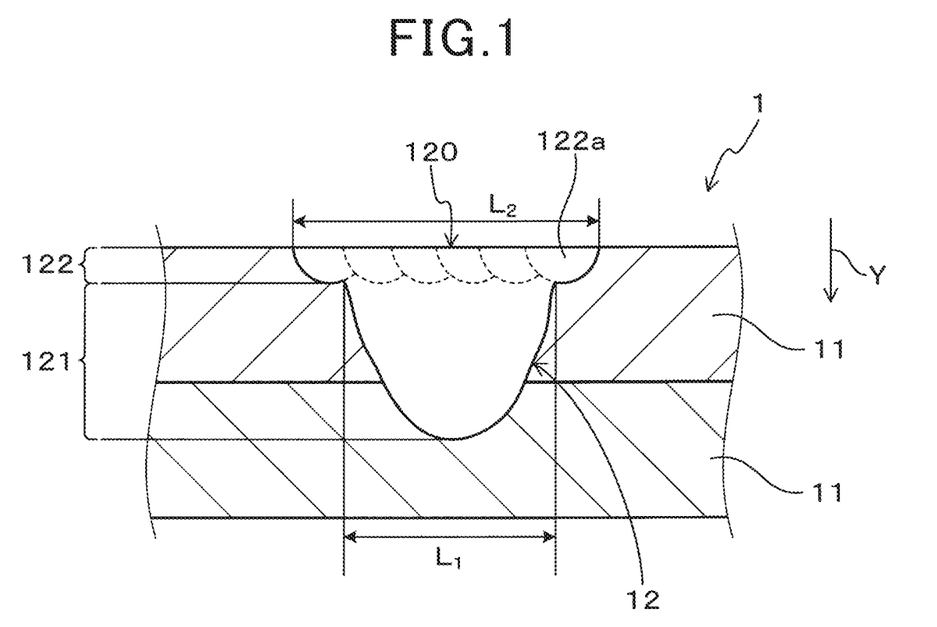
FIG. 1 is a diagram schematically showing an example of a cross section in the welding depth direction of a joining structure according to the first embodiment.
Figure 2:
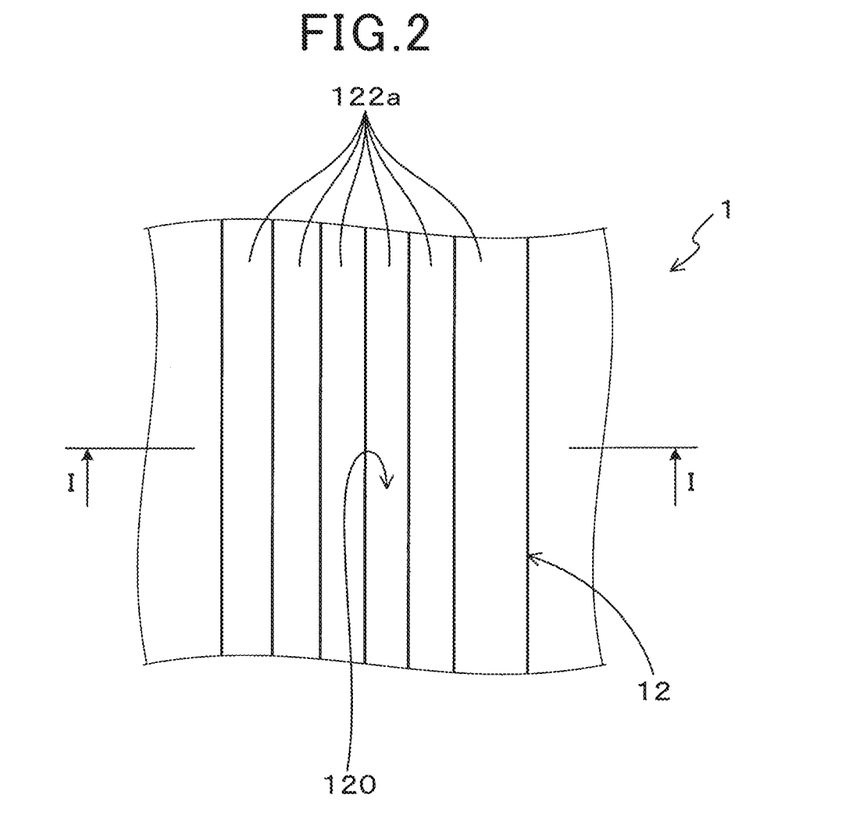
FIG. 2 is a diagram schematically showing an example of a welded part of the joining structure according to the first embodiment as viewed from the surface side.
Figure 3:
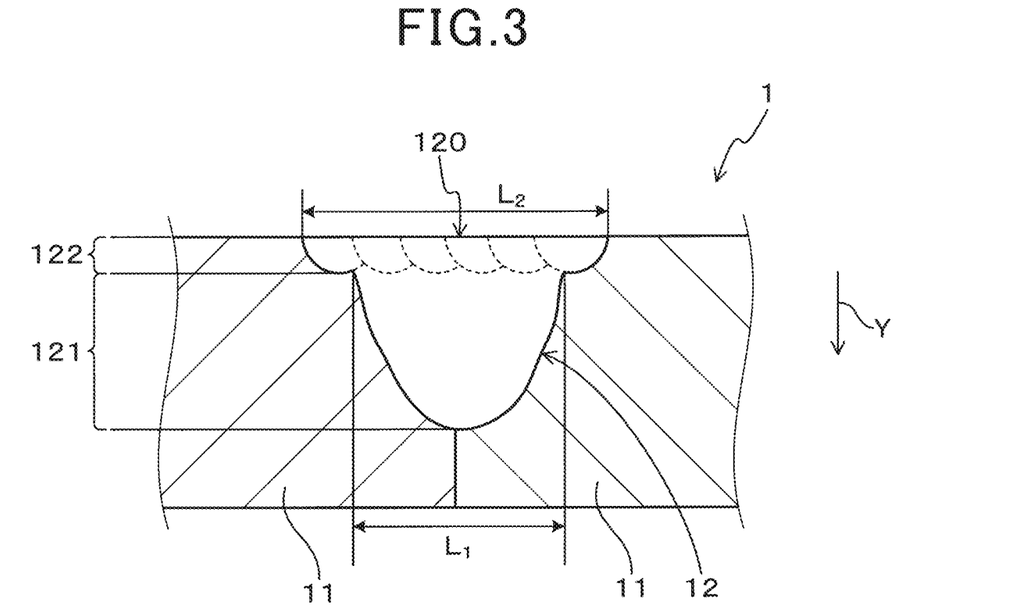
FIG. 3 is a diagram schematically showing another example of a cross section in the welding depth direction of the joining structure according to the first embodiment.

A joining structure according to the first embodiment will be described with reference to FIGS. 1-8. As illustrated in FIGS. 1 to 3, the joining structure 1 of the present embodiment has a welded part 12 that connects the joined members 11 together.

The joined members 11 are made of a metal (including an alloy) that forms a passive film. Examples of metals forming a passive film include Cr, Cr alloy, Al, Al alloy, Ti, and Ti alloy. Cr alloy includes Fe—Cr alloy such as stainless steel. The members to be joined 11 may be made of metals of the same kind or may be made of metals of different kinds.

The welded part 12 joins the members to be joined 11 together. The joining structure 1 shown in FIG. 1 shows an example in which the joined members 11 are stacked and the stacked joined members are stacked are connected to each other by the welded part 12. Alternatively, for example, as with the joining structure 1 shown in FIG. 3, the joined members 11 may abut each other, and the abutting joined members 11 may be connected by the welded part 12. Thus, the arrangement of the joined members 11 of the joining structure 1 is not particularly limited.

Further, in the present embodiment, the welded part 12 includes at least a part of the joined members 11 and/or a component of a welding rod provided upon welding. The welded part 12 is preferably made of a metal (including an alloy) that forms a passive film. More preferably, the welded part 12 can be made of Cr, Cr alloy, Al, Al alloy, Ti, Ti alloy, or the like.

Note that, in the present disclosure, the welded part 12 may include not only a portion formed by melting and solidifying the metal constituting the joined member 11, but also a portion formed by remelting and solidifying that metal that has been melted and solidified or melted and semi-solidified. However, in the present disclosure, the welded part 12 does not include the heat-affected zone.

Figure 4:
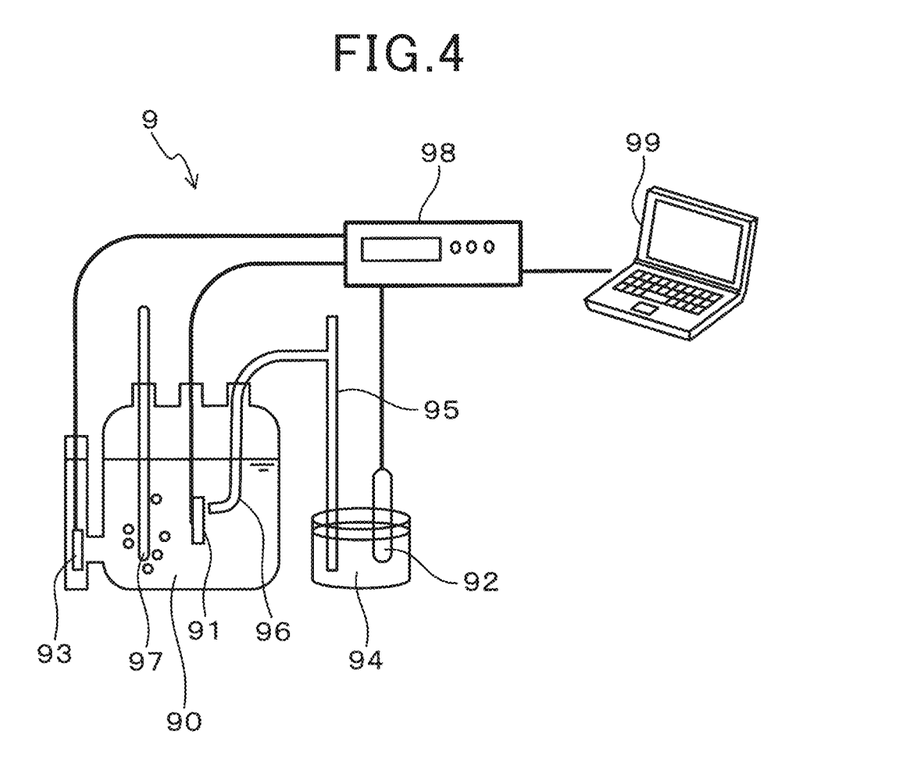
FIG. 4 is a diagram schematically showing an example of a pitting potential measuring device.

The outermost surface portion 120 of the welded part 12 has a pitting potential. Pitting potential is the potential at which the current density shows a sharp rise in the anodic polarization curve. At the pitting corrosion potential, pitting corrosion may occur, and thus it can be said that the pitting potential is the pitting corrosion generating potential. Specifically, pitting potential is the value measured in accordance with JIS G0577:2014, "Methods of pitting potential measurement for stainless steels". In the present disclosure, "having a pitting potential" means that a pitting potential is detected when pitting potential measurement is performed on a certain material. FIG. 4 shows an example of a pitting potential measuring device 9. A test solution 90 is a 3.5% (mass fraction) sodium chloride aqueous solution according to the method B. A test electrode 91 is a coated electrode prepared using an insulating material such as resin. The type of reference electrode 92 is an Ag/AgCl electrode. The counter electrode 93 is platinum (Pt). The potential sweep rate is 20 mV/min. The type of gas used for deaeration is Ar. In the pitting potential measuring device 9 of FIG. 4, reference numeral 94 is saturated KCl, reference numeral 95 is an agar salt bridge, reference numeral 96 is a Luggin capillary, reference numeral 97 is a gas pipe for deaeration, reference numeral 98 is a potentio/galvanostat, and reference numeral 99 is a computer.

Figure 5:
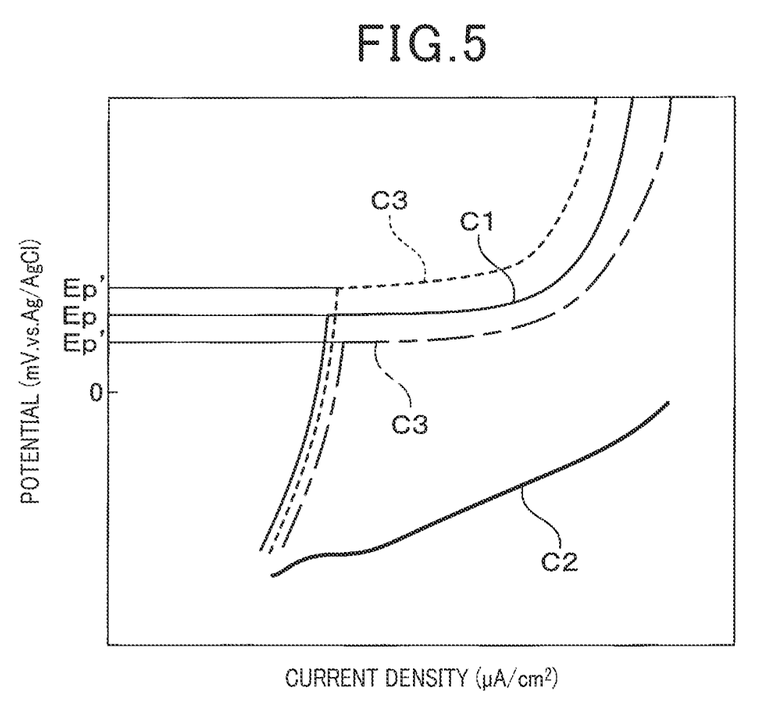
FIG. 5 is a diagram for explaining a case where the outermost surface portion of the welded part has a pitting potential.
Figure 6:
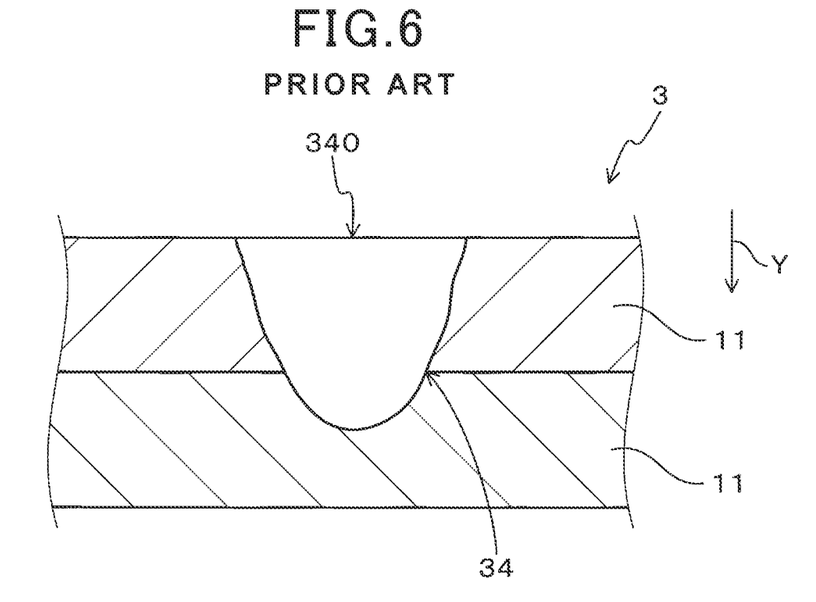
FIG. 6 is a diagram schematically showing an example of a cross section in the welding depth direction of the joining structure that has been formed by ordinary laser welding without performing modification.

FIG. 5 shows a schematic diagram of the relation between the current density ($\mu A/cm^2$) (horizontal axis) and the potential (mV.vs.Ag/AgCl) (vertical axis), obtained by the above-described pitting potential measuring method. In FIG. 5, the curve C1 is an anodic polarization curve of the part of the joining structure 1 other than the welded part 12 and the heat-affected zone around the welded part 12, that is, the curve of the base metal of the joined members. The base metal is formed of a metal(s) that forms a passive film, and it has a pitting potential Ep because it is not affected by the welding. The curve C3 is an anodic polarization curve of the outermost surface portion 120 of the welded part 12. The outermost surface portion 120 of the welded part 12 has a pitting potential Ep', and is passivated. In other words, it can be said that the outermost surface portion 120 of the welded part 12 has been modified so as to have the pitting potential Ep'. As shown in FIG. 5, the pitting potential Ep' may be smaller than the pitting potential Ep (Ep'<Ep), larger than the pitting potential Ep (Ep'>Ep), or the same as the pitting potential Ep (Ep'=Ep). For comparison, FIG. 6 schematically shows an example of a cross section in the welding depth direction Y of the joining structure 3 obtained by normal laser welding without performing the modification described later. The curve C2 shown in FIG. 5 is the anodic polarization curve of this welded part 34 on which modification was not performed. The outermost surface portion 340 of the welded part 34 has no pitting potential because the passive film is destroyed during welding and does not regenerate, and thus it is not passivated.

Specifically, as illustrated in FIGS. 1 and 3, the welded part 12 may include a welded part main body 121 formed inside the joining structure 1 and a surface-modified layer 122 formed on the welded part main body 121, and the surface-modified layer 122 may include the outermost surface portion 120 having a pitting potential. According to this configuration, the above-described operations and effects can be ensured. More specifically, the welded part main body 121 can include a portion formed by the metal forming the joined members 11 being melted and solidified as a result of the welding for connecting the joined members 11 together. The surface-modified layer 122 may include a portion formed by remelting and solidifying the melt-solidified metal or the melt-semisolidified metal. The boundary between the surface-modified layer 122 and the weld main body 121 can be confirmed by etching the cross section and performing metallographic observation.

In a cross-sectional view in the welding depth direction Y, the maximum diameter $L_2$ of the surface-modified layer 122 may be equal to or larger than the maximum diameter $L_1$ of the welded part main body 121. According to this configuration, when viewed from the surface of the welded part 12, the welded part main body 121 is hidden by the surface-modified layer 122. In other words, the surface of the welded part 12 is covered by the surface-modified layer 122, and the welded part main body 121 having worse corrosion resistance is not exposed on the surface of the welded part 12. Therefore, this configuration ensures improvement in corrosion resistance.

In the cross-sectional view in the welding depth direction Y, the layer thickness of the surface-modified layer 122 may be 0.5 μm or greater. According to this configuration, passivation of the surface of the surface-modified layer 122 can be ensured, and thus improvement in the corrosion resistance of the welded part 12 can be ensured.

To further ensure the above-described effects and for other reasons, the layer thickness may be preferably 0.6 μm or greater, more preferably 0.8 μm or greater, and even more preferably 1 μm or greater. To suppress thermal deformation due to increased heat input and for other reasons, the layer thickness may be preferably 100 μm or smaller. The layer thickness is an average of the thickness measurements obtained by measuring the thickness at 10 locations in the surface-modified layer 122 in the cross section in the welding depth direction Y.

It is preferable that spinel oxide is not detected on the outermost surface of the surface-modified layer 122 by X-ray absorption fine structure (XAFS) analysis. This is because the inventors of the present disclosure consider that spinel oxides such as Fe—Cr spinel reduce corrosion resistance. This will be described in detail below.

Figure 7:
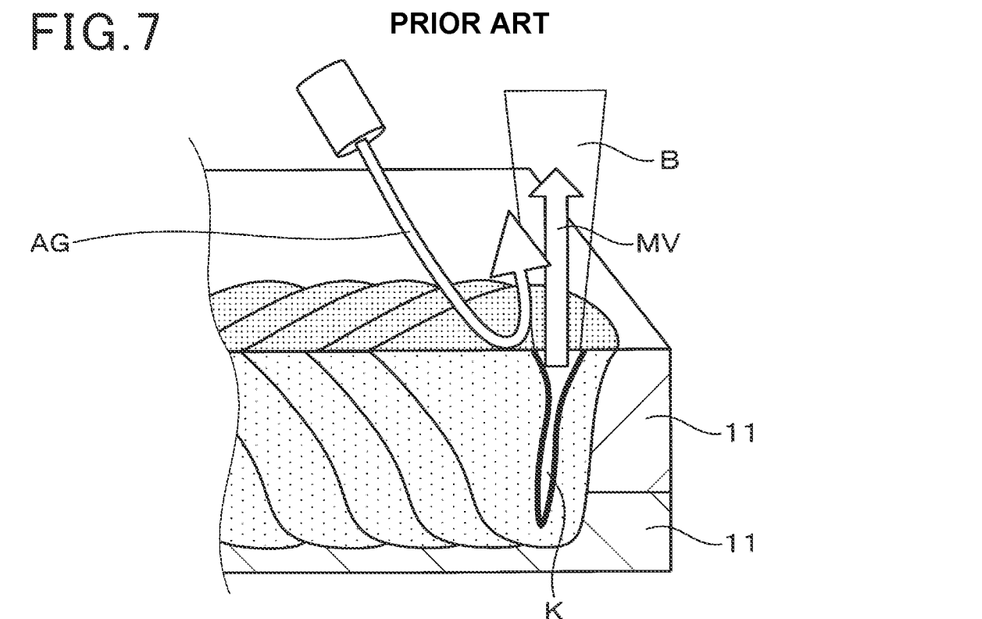
FIG. 7 is a diagram for explaining the mechanism by which spinel oxides are formed in the outermost surface portion of the welded part of a conventional joining structure.
Figure 8:
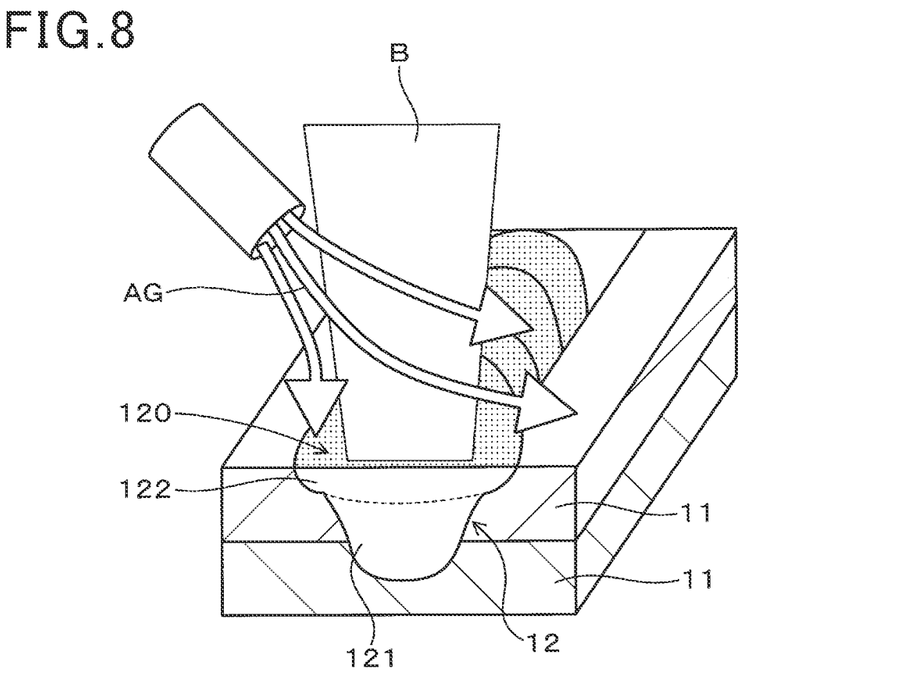
FIG. 8 is a diagram for explaining the method of forming the surface-modified layer by modifying (remelting and solidifying) the outermost surface portion of the welded part so that a keyhole is not generated.

As shown in FIG. 7, a case is considered where the joined members 11 are welded together by a high energy beam B such as a laser beam in the atmospheric air while supplying an inert gas such as Ar gas or $N_2$ gas as an assist gas AG. In this case, the irradiation of the energy beam B causes the molten metal to evaporate MV, and a deep cavity called a keyhole K is formed in the metal forming the joined member (s) 11. At this time, the metal vaporization MV causes airflow induction, and oxygen is excessively supplied to the welding site from the atmospheric air. As a result, when welding is performed only by high-energy beam welding such as laser welding, oxidation proceeds excessively, and spinel oxide such as Fe—Cr spinel is generated in the passive film on the outermost surface. Specifically, for example, in the case of stainless steel or the like, Fe—Cr spinel is formed in the passive film containing CrOHO and $Cr_2O_3$. The spinel oxide thus formed by such welding becomes a cause of deterioration in the corrosion resistance. However, as shown in FIG. 8, if the outermost surface portion of the welded part 12 is welded shallowly so that the keyhole K is not formed in the atmospheric air while supplying an inert gas such as Ar gas or $N_2$ gas as the assist gas AG, in other words, if it is remelted and solidified (modified) so as to prevent formation of the keyhole K, excessive oxidation is prevented, the surface-modified layer 122 can be formed in which spinel oxide is not detected by X-ray absorption fine structure analysis.

The joining structure 1 described above can be applied to structures that require corrosion resistance in various industries. For example, the joining structure 1 can be applied to various parts that require corrosion resistance in the automotive field. The joining structure 1 can exhibit high corrosion resistance even if the surface of the welded part 12 is not coated. Therefore, the joining structure 1 can be suitably applied to various parts in the automobile field, which are often used in a severe corrosion-promoting environment due to salt water. Examples of such various parts include automotive engine components such as a high-pressure fuel pump for a direct injection gasoline engine.

As described above, the welded part 12 of the joining structure 1 can be formed by welding together the joined members 11 with a high energy beam B such as laser light in the air atmosphere while supplying an inert gas such as Ar gas or $N_2$ gas as the assist gas AG, and further remelting the surface layer of the melt-solidified metal or the melt-semi-solidified metal with the high energy beam B such as laser light and solidifying it in such a manner that the keyhole K is not formed. That is, only the surface layer of the formed weld portion is remelted and solidified, and the portion deeper than the surface layer is not remelted and solidified. According to this manufacturing method, the high-energy beam B used when welding the joined members 11 can be reused for the surface modification of the welded part 12, which provides advantages such as simplification of the manufacturing process and cost reduction. To ensure the effect of corrosion resistance improvement provided by the surface-modified layer 122 and for other reasons, the region of the surface layer to be remelted and solidified may be the region within the depth range of 0.5 μm or greater in the welding depth direction Y from the outermost surface layer of the welded portion.

In the present embodiment, the surface-modified layer 122 may have a plurality of weld beads 122a as shown in FIGS. 1 and 2. The weld beads 122a are a portion formed by remelting and solidifying the melt-solidified metal or melt-semisolidified metal. In addition, the weld beads 122a may or may not protrude from the surface. In this example, adjacent weld beads 122a overlap with each other. That is, the surface-modified layer 122 is formed by the adjacent welding beads 122a partially overlapping with each other. The surface-modified layer 122 having the weld beads 122a can be formed by, for example, a modification process including dividing the welded portion surface to be modified into a plurality of areas, and sequentially scanning the divided areas using an energy beam (laser light) having such a beam intensity (laser intensity) that does not form a keyhole K, in such a manner that the contours of the energy beam (laser light) overlap, to thereby irradiate the welded portion surface to be modified with the energy beam. Specifically, the surface-modified layer 122 shown in FIGS. 1 and 2 can be formed by, for example, a modification process including dividing the surface of the melt-solidified part formed by laser welding into a plurality of areas, and sequentially scanning the areas linearly (performing a plurality of scans), using laser light having such a laser intensity that it does not form a keyhole K, so that the contours of the laser light overlap, to thereby irradiate the surface of the melt-solidified part with the laser light. According to this method, since an energy beam (laser light) having a lower energy is used on the welded portion surface to be modified, the heat affected zone of the modification treatment can be reduced.

Second Embodiment

A joining structure according to the second embodiment will be described with reference to FIGS. 9 to 11A and 11B and FIGS. 12A and 12B. Note that, among the reference signs used in the second and following embodiments, the same reference signs as those used in the earlier embodiment (s) denote components or the like that are similar to those of the earlier embodiment(s) unless otherwise noted.

Figure 9:
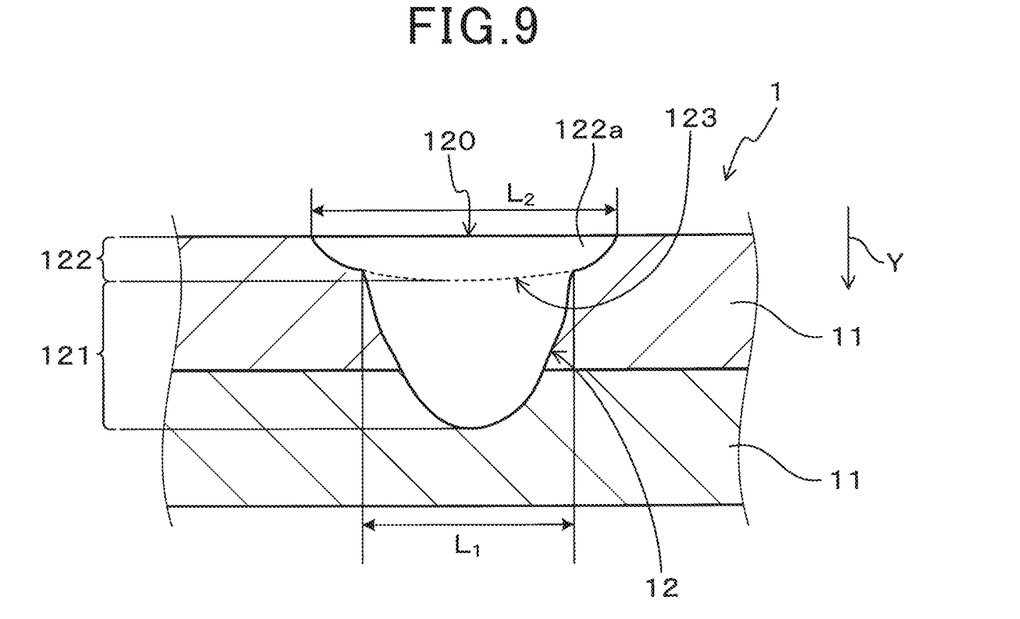
FIG. 9 is a diagram schematically showing an example of a cross section in the welding depth direction of the joining structure according to the second embodiment.
Figure 10:
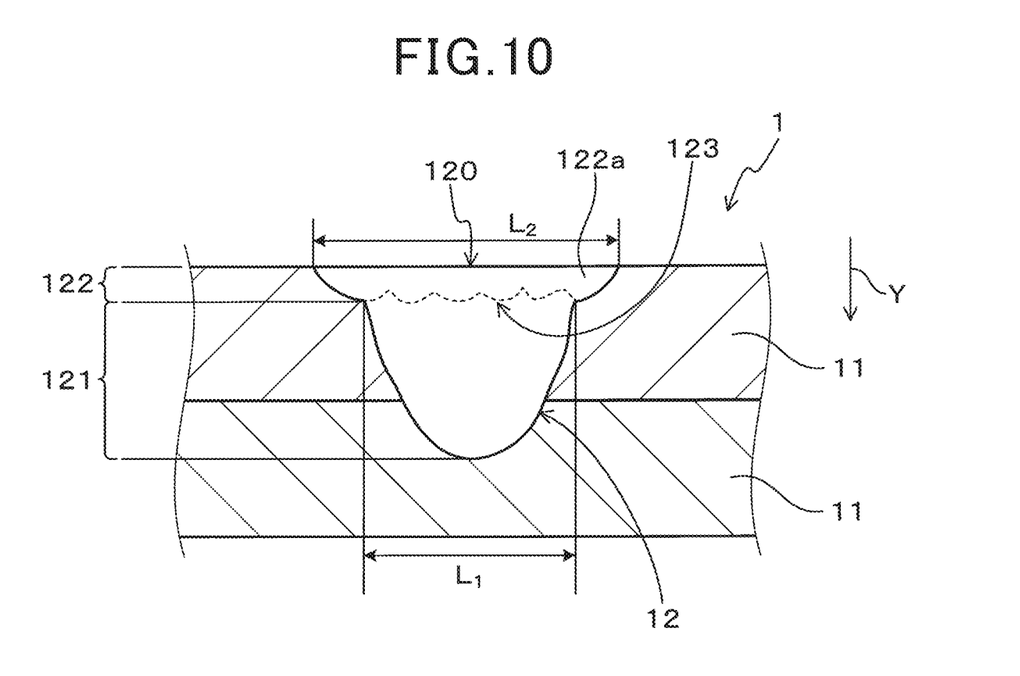
FIG. 10 is a diagram schematically showing another example of a cross section in the welding depth direction of the joining structure according to the second embodiment.

As illustrated in FIGS. 9 and 10, the surface-modified layer 122 of the joining structure 1 of the present embodiment has a single weld bead 122a. For example, as shown in FIG. 9, in the cross section in the welding depth direction Y, the interface 123 between the surface-modified layer 122 and the weld main body 121 may have a convex shape with the curved side on the weld main body 121 side. Note that FIG. 9 shows a case where the interface 123 between the surface-modified layer 122 and the weld main body 121 is curved in an arc shape protruding toward the weld main body. Alternatively, the interface 123 between the surface-modified layer 122 and the weld main body 121 can be formed to have irregularities as shown in FIG. 10, for example.

The surface-modified layer 122 having a plurality of weld beads 122a described above in connection with the first embodiment is formed by performing multiple scans using the energy beam. On the other hand, a surface-modified layer 122 having a single weld bead 122a like the joining structure of the present embodiment can be formed by performing a single scan. Therefore, according to this configuration, a joining structure 1 capable of improving the production efficiency can be obtained.

Figure 11A:
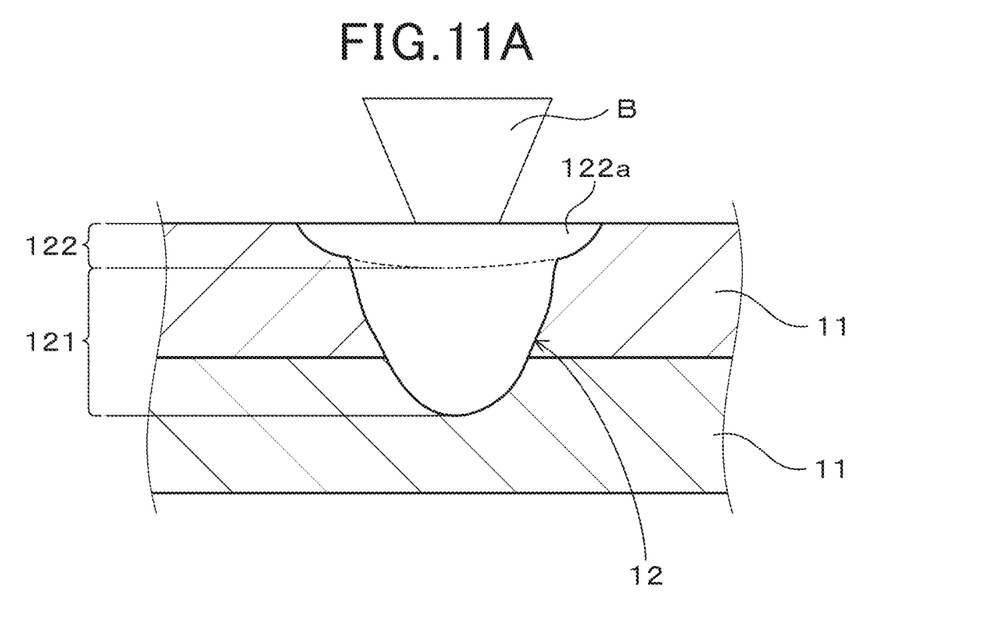
FIGS. 11A and 11B are diagrams for explaining an example of a method for producing the joining structure shown in FIG. 9.
Figure 11B:
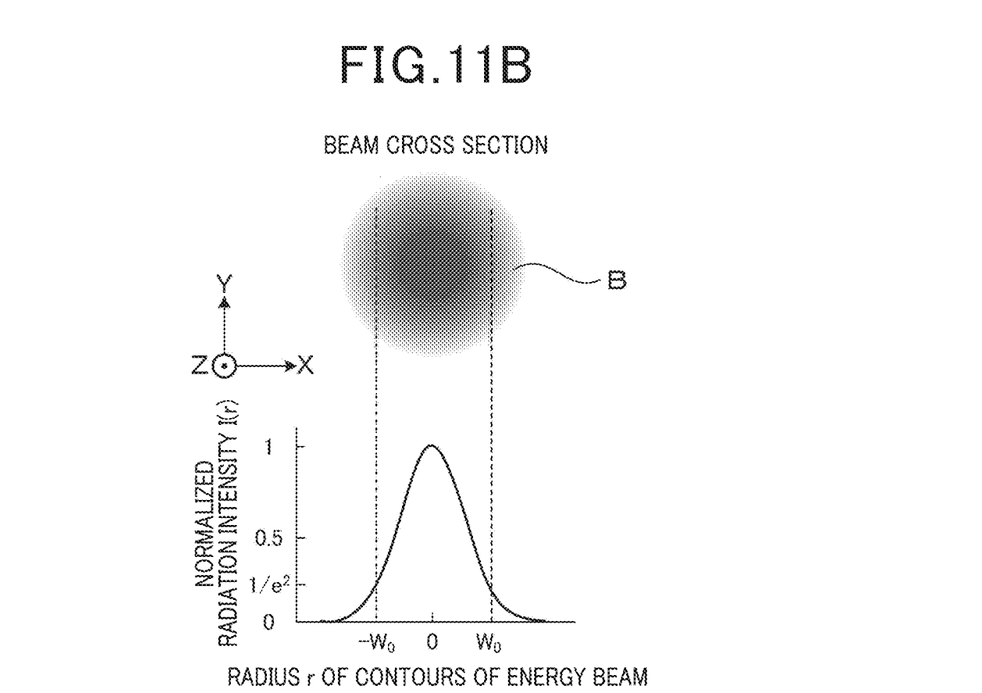
Figure 12A:
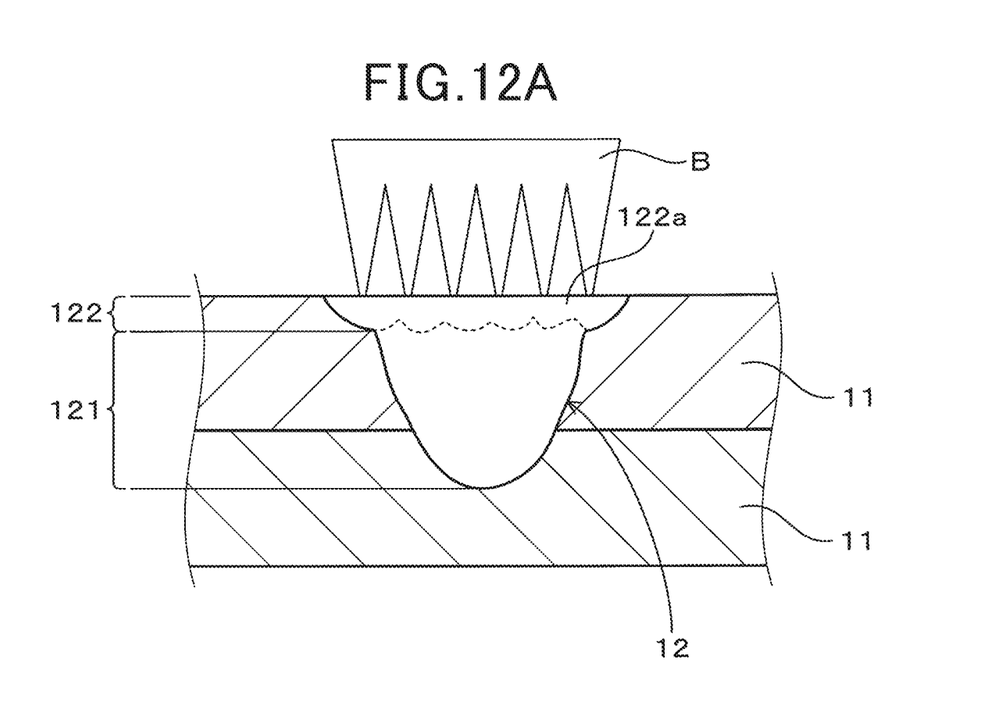
FIGS. 12A and 12B are diagrams for explaining an example of a method for producing the joining structure shown in FIG. 10.
Figure 12B:
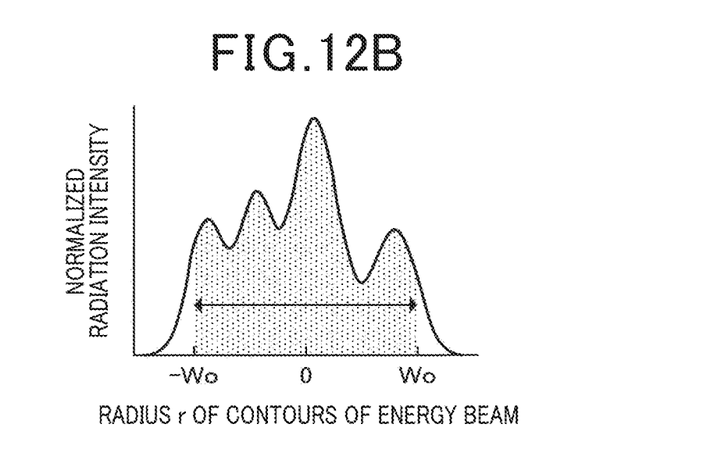

Specifically, the surface-modified layer 122 as shown in FIG. 9 can be formed by, for example, as shown in FIGS. 11A and 11B, irradiating the welded portion surface to be modified with an energy beam B such that it matches with the outer shape of the welded portion surface to be modified, in a mode (single mode) in which the normalized radiation intensity of the energy beam B is represented by a Gaussian distribution. The surface-modified layer 122 as shown in FIG. 9 has a smaller energy loss during its formation and thus the energy efficiency is good. Alternatively, the surface-modified layer 122 as shown in FIG. 10 may be formed by, for example, as shown in FIGS. 12A and 12B, irradiating the welded portion surface to be modified with an energy beam B such that it matches with the outer shape of the welded portion surface to be modified, in a mode (multi mode) in which the normalized radiation intensity distribution of the energy beam B has a plurality of peaks. A surface-modified layer 122 as shown in FIG. 10 has an advantage that the energy input during its formation can be uniform. The other configurations, functions, and effects are similar to those of the first embodiment.

EXPERIMENTAL EXAMPLES

Experimental Example 1

Bead-on-plate welding was performed using a plate material made of DSUS430 by a laser welding device in the atmospheric air while supplying $N_2$ gas as an assist gas, in such a manner that a keyhole was formed. A "TruDiode 4006" manufactured by Trumpf was used as the laser welding device. The laser welding conditions were as follows; spot diameter: 0.6 mm, output: 1200 W, welding speed: 25 mm/s, $N_2$ gas flow rate: 40 L/min. Next, surface modification was performed using the laser welding device by further remelting and solidifying the surface layer of the metal that had been melted and solidified by the laser welding in such a manner that a keyhole K was not formed. The depth range of the remelting and solidifying was set at 0.5 μm or greater in the welding depth direction from the outermost surface of the melt-solidified metal. The laser modification conditions were as follows; spot diameter: 0.6 mm, output: 200 W, welding speed: 25 mm/s, $N_2$ gas flow rate: 40 L/min. The sample obtained from the above-described surface modification is referred to as Sample 1. Note that, in this example, welding was not actually performed on a laminate of plate materials, but a single plate material was irradiated with a laser. This is because this example is an experimental example for confirming the presence/absence of a passive film on the outermost surface irradiated with a laser.

Sample 1C was prepared by not performing the surface modification in the preparation of Sample 1.

Sample 2 was prepared in the same manner as in the preparation of Sample 1 except that a plate material made of SUS436MT was used instead of the plate material made of DSUS430.

Sample 2C was prepared by not performing the surface modification in the preparation of Sample 2.

Next, the surfaces of Samples 1 and 2 were masked such that the modified parts are exposed and the other parts are masked. Then, their pitting potentials were measured according to JIS G0577. The pitting potentials of the base materials of Samples 1 and 2 were also measured in the same manner. Further, the pitting potentials of the metal surfaces melted and solidified by the laser welding of Samples 1C and 2C were similarly measured.

Figure 13:
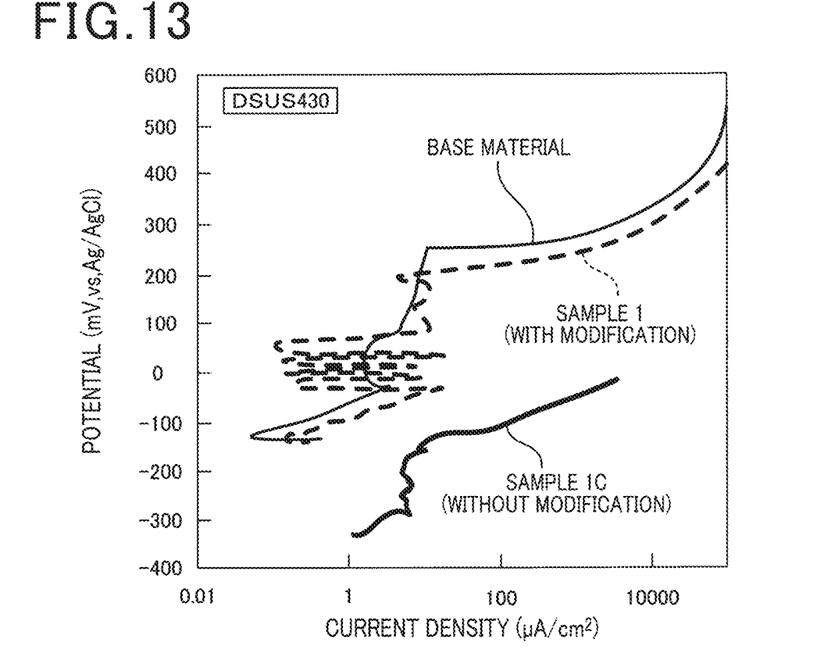
FIG. 13 is a diagram showing measurement results of the pitting potentials of the welded parts of Sample 1 and Sample 1C prepared in Experimental Example 1.
Figure 14:
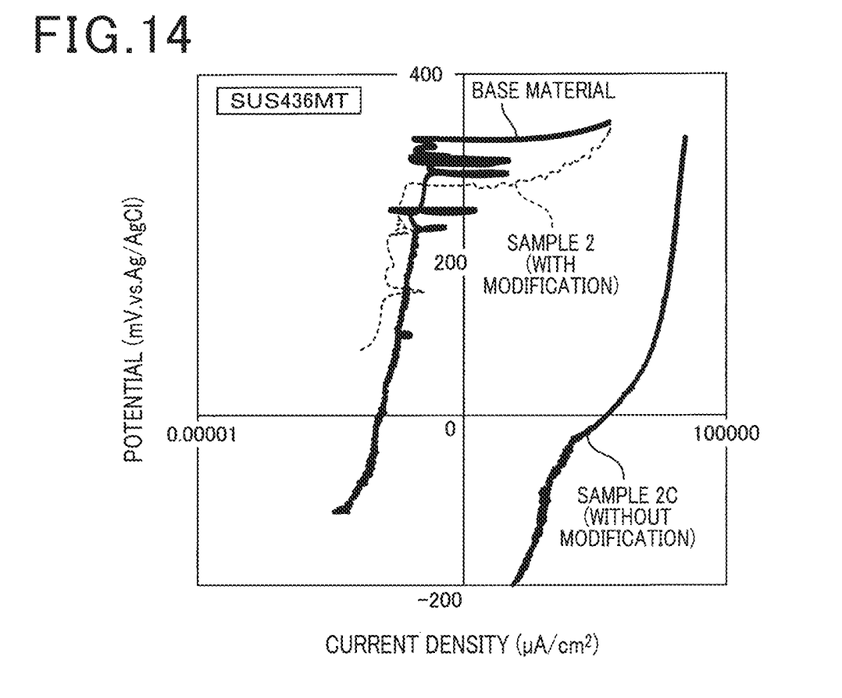
FIG. 14 is a diagram showing measurement results of the pitting potentials of the welded parts of Sample 2 and Sample 2C prepared in Experimental Example 1.

The results are shown in FIGS. 13 and 14. Regarding Sample 1, the pitting potential of the base metal was 250 mV, the pitting potential of the outermost surface portion of the welded part was 200 mV, and the ratio of the pitting potential of the outermost surface portion of the welded part to the pitting potential of the base material was 80%. Regarding Sample 2, the pitting potential of the base metal was 330 mV, the pitting potential of the outermost surface portion of the welded part was 290 mV, and the ratio of the pitting potential of the outermost surface portion of the welded part to the pitting potential of the base material was 88%. On the other hand, as for Samples 1C and 2C, the surface of the metal melted and solidified by laser welding remained exposed, and they did not have a pitting potential. From these results, it can be understood that the surface modification recovers the pitting potential of the outermost surface portion of the welded part to 80% or higher of the pitting potential of the base material, and thus improves the corrosion resistance of the welded part.

Experimental Example 2

An X-ray absorption fine structure analysis was performed on the outermost surface of the surface-modified layer of Sample 1 prepared in Experimental Example 1 and the outermost surface of the melt-solidified metal of Sample 1C. Aichi Synchrotron Radiation Center Aichi SR (beam line: BL11S2, analysis method: hard X-ray XAFS (X-ray absorption near edge fine structure method), detection method: partial fluorescence yield (PFY) method, conversion electron yield (CEY) method) was used as the XAFS measuring instrument for X-ray absorption fine structure analysis. The measurement conditions were as follows; calibration condition: inflection point of absorption edge of fcc-Cu foil (thickness: 10 μm), PFY detector: 7 ch SDD (Silicon drift Detector), CEY detector: conversion electron cell (He at atmospheric pressure of 1 atm, −500 V applied), Cr—K edge measurement range: 5985 eV to 6035 eV, Fe—K edge measurement range: 7100 eV to 7180 eV.

As a result, Fe—Cr spinel was detected in addition to $Cr_2O_3$ and CrOHO from Sample 1C, but as for Sample 1, $Cr_2O_3$ and CrOHO were detected but Fe—Cr spinel was not detected. Combining this result with the results of Experimental Example 1, it was confirmed that Fe—Cr spinel is the cause of reduced corrosion resistance.

Experimental Example 3

Figure 15A:
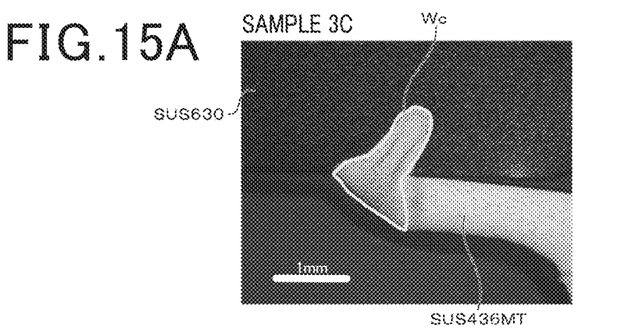
FIGS. 15A to 15D are diagrams comparing the welded part of the joining structure of Sample 3 and the welded part of the joining structure of Sample 3C prepared in Experimental Example 3.
Figure 15B:
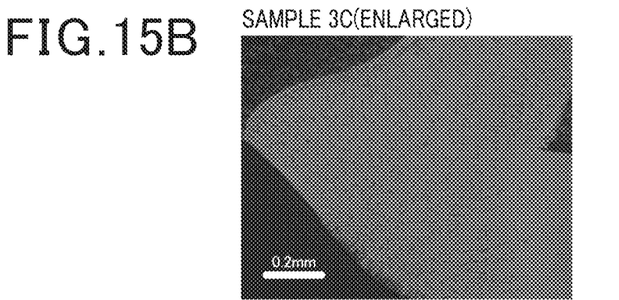

A first member to be joined made of SUS630 and a second member to be joined made of SUS436MT were stacked and welded with a laser in the same manner as in Experimental Example 1. Next, as with Experimental Example 1, surface modification was performed by remelting and solidifying the surface layer of the metal that had been melted and solidified by the laser welding in such a manner that a keyhole K is not formed. Surface modification was performed by dividing the surface of the melt-solidified part formed by laser welding into a plurality of areas, and sequentially scanning, using laser light having such a laser intensity that it does not form a keyhole K, the divided areas linearly so that the contours of the laser light overlap, to thereby irradiate the surface of the melt-solidified part with the laser light. The joining structure thus obtained is referred to as Sample 3. In addition, a joining structure referred to as Sample 3C was prepared by not performing the surface modification in the preparation of the joining structure of Sample 3. A cross section of each sample in the welding depth direction was etched, and the etched cross sections were observed by SEM. The results are shown in FIGS. 15A to 15D. Note that, in FIG. 15A, the portion surrounded by the white line Wc is the metal portion melt-solidified by laser welding. FIG. 15B is an enlarged view of it. Further, in FIG. 15C, the portion surrounded by the white line W is the surface-modified layer. FIG. 15D is an enlarged view of it.

Figure 15C:
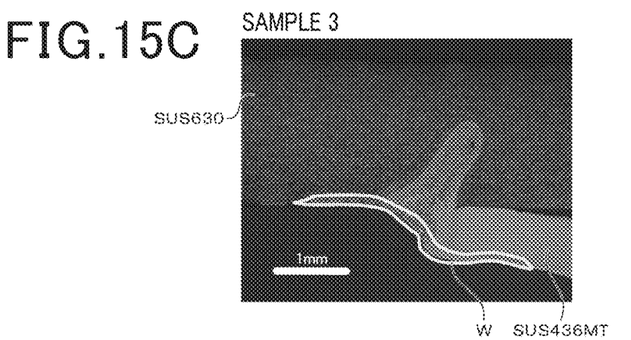
Figure 15D:
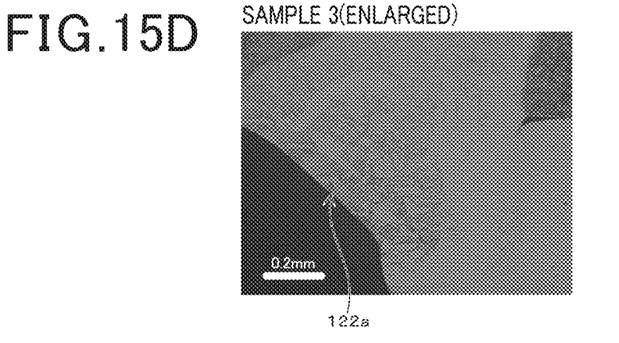

As shown in FIGS. 15C and 15D, it was confirmed that the welded part of the joining structure of Sample 3 includes a welded part main body formed inside and a surface-modified layer formed on the welded part main body. Therefore, the pitting potential measured in Experimental Example 1 described above is the pitting potential of the outermost surface portion of the surface-modified layer. Further, the maximum diameter of the surface-modified layer was equal to or larger than the maximum diameter of the welded part main body. Therefore, it was confirmed that, according to this example, the manufacturing process can be simplified and a joining structure having high corrosion resistance can be obtained.

Further, as shown in FIG. 15D, it was confirmed that the surface-modified layer of the welded part of the joining structure of Sample 3 has a plurality of weld beads arranged so that the adjacent ones overlap with each other.

Experimental Example 4

A first member to be joined made of DSUS13A and a second member to be joined made of DSR7 were welded with laser in the same manner as in Experimental Example 3. Next, as with Experimental Example 1, surface modification was performed by remelting and solidifying the surface layer of the metal that had been melted and solidified by the laser welding in such a manner that a keyhole K is not formed. Note that, in this example, to be specific, the first and second joined members are components of a high-pressure fuel pump for a direct injection gasoline engine. Further, in this example, the surface-modified layer was composed of a single bead. The joining structure thus obtained is referred to as Sample 4. In addition, a joining structure referred to as Sample 4C was prepared by not performing the surface modification in the preparation of the joining structure of Sample 4.

Figure 16:
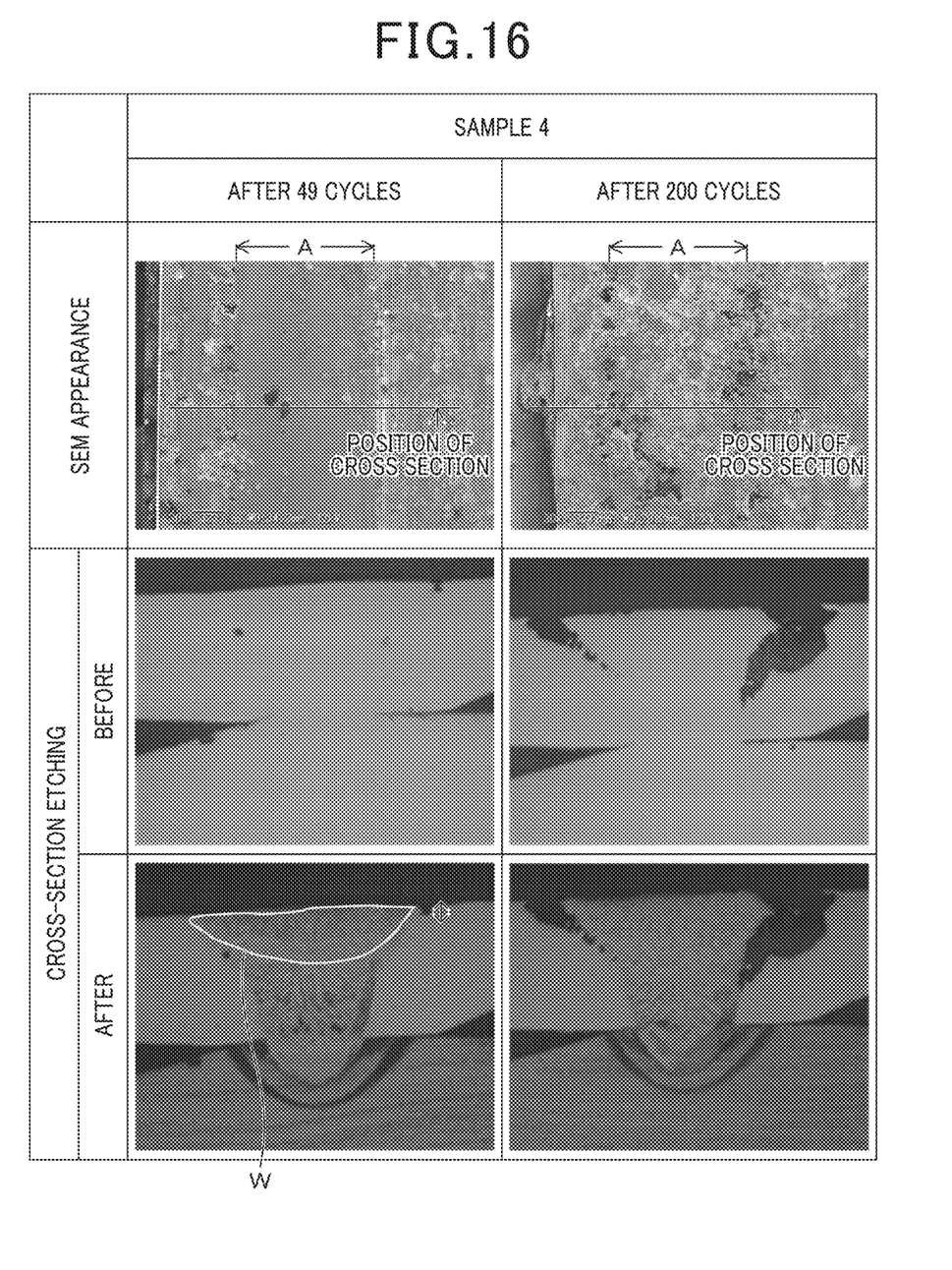
FIG. 16 is a diagram showing the results of a combined cycle test performed on the welded part of the joining structure of Sample 4 prepared in Experimental Example 4.
Figure 17:
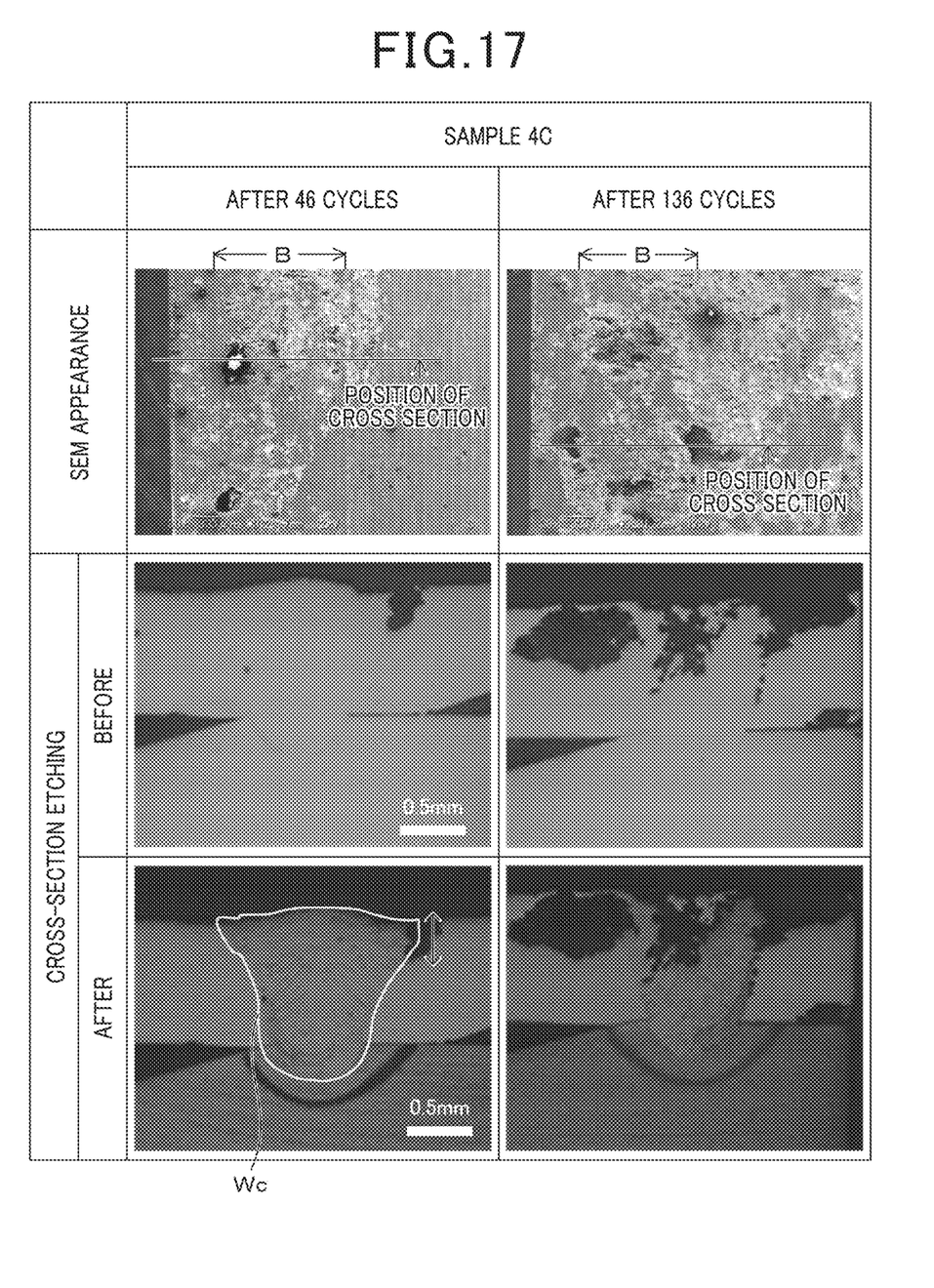
FIG. 17 is a diagram showing the results of a combined cycle test performed on the welded part of the joining structure of Sample 4C prepared in Experimental Example 4.

A combined cycle test was performed on each sample. A combined cycle test is a test in which a sample is left in a spray chamber in which a cycle of the test conditions described in JIS K5600-7-9: 2006, "Determination of resistance to cyclic corrosion conditions" is repeated multiple times. After the combined cycle test, the appearance of each sample was observed by SEM, and also a cross section in the welding depth direction was etched to observe the cross section before and after etching by SEM. The results are shown in FIGS. 16 and 17. In FIG. 17, the portion surrounded by the white line Wc shown in the image of the cross section after etching is the metal portion melt-solidified by laser welding. Further, in FIG. 16, the portion surrounded by the white line W shown in the image of the cross section after etching is the surface-modified layer.

As shown in FIGS. 16 and 17, the welded part A of Sample 4 on which surface modification was performed and the welded part B of Sample 4C on which surface modification was not performed are compared. On the lower cycle side (the left half of each figure), the pitting depth (the portion indicated by the double-headed arrow in the image of the cross section after etching) generated in the welded part of Sample 4C on which surface modification was not performed was 0.265 mm. On the other hand, the pitting depth generated in the welded part of Sample 4 on which surface modification was performed was 0.076 mm. This result shows that the welded part of Sample 4 has higher corrosion resistance than the welded part of Sample 4C. In addition, the results on the higher cycle side (the right half of each figure) show that the corrosion rate of Sample 4 is slower than that of Sample 4C, and the corrosion resistance has significantly improved.

The present disclosure is not limited to the above embodiments and experimental examples, and various modifications can be made without departing from the scope of its gist. In addition, the configurations of the embodiments and the experimental examples can be combined as appropriate.

What is claimed is:

1. A joining structure having a welded part for connecting joined members made of a metal that forms a passive film when the metal is welded, wherein
an outermost surface portion of the welded part has a pitting potential;
the welded part comprises:
a welded part main body formed inside, and
a surface-modified layer formed in contact with the welded part main body;
the surface-modified layer includes the outermost surface portion having the pitting potential and a portion formed by remelting and solidifying a melt-semi-solidified metal;
the welded part is formed by remelting and solidifying only the portion of the surface-modified layer without remelting the welded part main body, which is deeper than the surface-modified layer, such that formation of a keyhole in the welded part is prevented;
the portion of the surface-modified layer formed by remelting and solidifying the melt-semi-solidified metal has a depth range of 0.5 µm or greater and 100 µm or smaller from the outermost surface portion of the welded part in a welding depth direction such that thermal deformation is suppressed; and
after remelting and solidifying the portion of the surface-modified layer, spinel oxide is not detectable by an X-ray absorption fine structure analysis of the outermost surface portion of the surface-modifier layer due to the portion of the surface-modified layer of the welded part being remelted and solidified to prevent formation of the keyhole.

2. The joining structure according to claim 1, wherein a maximum diameter of the surface-modified layer is equal to or larger than a maximum diameter of the welded part main body as viewed in a cross section in a welding depth direction.

3. The joining structure according to claim 1, wherein the surface-modified layer has a plurality of weld beads arranged so that adjacent weld beads overlap with each other.

4. The joining structure according to claim 1, wherein the surface-modified layer has a single weld bead.

5. The joining structure according to claim 1, wherein the welded part is made of Cr, Cr alloy, Al, Al alloy, Ti, or Ti alloy.

* * * * *